US010616408B2

(12) United States Patent
Rist et al.

(10) Patent No.: US 10,616,408 B2
(45) Date of Patent: Apr. 7, 2020

(54) METHOD FOR AUTOMATIC START UP OF A COMMUNICATION TERMINAL CONFIGURED FOR VOICE COMMUNICATION ON A COMMUNICATION TERMINAL CONFIGURED FOR TEXT COMMUNICATION

(71) Applicant: Unify GmbH & Co. KG, Munich (DE)

(72) Inventors: Claus Rist, Bochum (DE); Sebastian Cordes, Lippstadt (DE); Stephan Fischer, Sprockhovel (DE)

(73) Assignee: Unify GmbH & Co. KG, Munich (DE)

( * ) Notice: Subject to any disclaimer, the term of this patent is extended or adjusted under 35 U.S.C. 154(b) by 410 days.

(21) Appl. No.: 15/487,625

(22) Filed: Apr. 14, 2017

(65) Prior Publication Data

US 2017/0223185 A1 Aug. 3, 2017

Related U.S. Application Data

(63) Continuation of application No. 13/990,281, filed as application No. PCT/EP2011/006512 on Dec. 22, 2011, now abandoned.

(30) Foreign Application Priority Data

Dec. 23, 2010 (EP) .................................... 10016050
Jul. 8, 2011 (EP) .................................... 11005594

(51) Int. Cl.
*H04M 3/42* (2006.01)
*H04L 12/58* (2006.01)
(Continued)

(52) U.S. Cl.
CPC ...... *H04M 3/42374* (2013.01); *G06F 9/4416* (2013.01); *H04L 51/043* (2013.01);
(Continued)

(58) Field of Classification Search
CPC ..... G06F 9/4416; H04L 51/066; H04L 51/04; H04L 69/08; H04M 2203/651;
(Continued)

(56) References Cited

U.S. PATENT DOCUMENTS 5,333,266 A 7/1994 Boaz et al.
5,475,738 A * 12/1995 Penzias ................. H04L 51/066
379/88.13
(Continued)

FOREIGN PATENT DOCUMENTS

CN 101502086 A 8/2009
DE 10159636 A1 6/2003
(Continued)

OTHER PUBLICATIONS

Written Opinion of the International Searching Authority for PCT/EP2011/006512 dated Apr. 20, 2012 (Form PCT/ISA/237) (German Translation).
(Continued)

Primary Examiner — Aaron N Strange
(74) Attorney, Agent, or Firm — Buchanan Ingersoll & Rooney PC

(57) ABSTRACT

In the case of a method or an arrangement for the automatic start up of a first communication terminal (EG A, EG B) configured for voice communication on at least one second communication terminal (CL A, CL B) configured for text communication, the voice communication between communication terminals is conveyed via at least one voice communication server (SCS) and the text communication between communication terminals is conveyed via at least one text communication server (TCS). The at least one voice communication server (SCS) and the at least one text communication server (TCS) exchange information via at least one conversion device (GW). The start up of at least
(Continued)

one first communication terminal (CL A, CL B) is effected via the at least one text communication server (TCS), the at least one conversion device (GW) and the at least one voice communication server (SCS) to at least one second voice communication terminal (EG A, EG B).

18 Claims, 8 Drawing Sheets

(51) Int. Cl.
  *H04M 7/00* (2006.01)
  *G06F 9/4401* (2018.01)
  *H04L 29/06* (2006.01)
(52) U.S. Cl.
  CPC ........ *H04L 51/066* (2013.01); *H04L 65/1046* (2013.01); *H04M 3/42365* (2013.01); *H04M 3/42382* (2013.01); *H04M 7/0042* (2013.01); *H04M 2203/651* (2013.01); *H04M 2203/652* (2013.01)
(58) Field of Classification Search
  CPC ....... H04M 2203/652; H04M 3/42365; H04M 3/42382; H04M 7/0042; H04M 2203/655; H04M 7/0045
  See application file for complete search history.

(56) References Cited

U.S. PATENT DOCUMENTS

| | | | | |
|---|---|---|---|---|
| 5,608,786 | A * | 3/1997 | Gordon | G06Q 10/107 358/402 |
| 6,195,636 | B1 | 2/2001 | Crupi et al. | |
| 6,937,612 | B1 * | 8/2005 | Mauger | H04L 29/06 370/465 |
| 7,317,716 | B1 * | 1/2008 | Boni | H04L 29/06027 370/260 |
| 7,912,187 | B1 * | 3/2011 | Mikan | H04L 51/043 379/88.14 |
| 8,509,408 | B2 | 8/2013 | Goodman et al. | |
| 2003/0185359 | A1 * | 10/2003 | Moore | G06Q 20/085 379/114.01 |
| 2004/0086100 | A1 * | 5/2004 | Moore | G06Q 20/085 379/201.01 |
| 2004/0186909 | A1 * | 9/2004 | Greenwood | H04L 51/04 709/227 |
| 2005/0141691 | A1 | 6/2005 | Wengrovitz | |
| 2005/0198096 | A1 * | 9/2005 | Shaffer | H04L 29/06027 709/200 |
| 2006/0114882 | A1 | 6/2006 | Mills | |
| 2007/0016640 | A1 | 1/2007 | Auvray et al. | |
| 2007/0116194 | A1 * | 5/2007 | Agapi | H04L 29/06027 379/67.1 |
| 2008/0049923 | A1 | 2/2008 | Gass | |
| 2009/0111432 | A1 | 4/2009 | Wilson et al. | |
| 2009/0225962 | A1 | 9/2009 | Corry et al. | |
| 2010/0316213 | A1 * | 12/2010 | Goel | G10L 15/22 379/265.09 |
| 2011/0116505 | A1 | 5/2011 | Hymus et al. | |
| 2012/0053932 | A1 * | 3/2012 | Rist | H04M 3/42365 704/201 |
| 2015/0032925 | A1 | 1/2015 | Childester et al. | |

FOREIGN PATENT DOCUMENTS

| | | |
|---|---|---|
| EP | 1499097 A2 | 1/2005 |
| EP | 1499097 A3 | 1/2005 |
| EP | 2469821 A1 | 6/2012 |
| WO | 98/51092 A1 | 11/1998 |
| WO | 2006059206 A1 | 6/2006 |

OTHER PUBLICATIONS

International Search Report for PCT/EP2011/006512 dated Apr. 20, 2012 (Forms PCT/ISA/220, PCT/ISA/210) (German Translation).
Siemens Enterprise Communication GmbH & Co., Information—OpenScape MobileConnect.
OpenScape V1.0 Technical White Paper, Siemens Information and Communication Network Inc., Apr. 2003.
International Preliminary Report on Patentability and Written Opinion for PCT/EP2011/006512 dated Jul. 4, 2013 (German Translation).
International Preliminary Report on Patentability and Written Opinion for PCT/EP2011/006512 dated Jul. 4, 2013 (EnglishTranslation).

* cited by examiner

METHOD FOR AUTOMATIC START UP OF A COMMUNICATION TERMINAL CONFIGURED FOR VOICE COMMUNICATION ON A COMMUNICATION TERMINAL CONFIGURED FOR TEXT COMMUNICATION

CROSS REFERENCE TO RELATED APPLICATIONS

This application is a continuation application of U.S. patent application Ser. No. 13/990,281, which is the United States national phase under 35 U.S.C. § 371 of PCT International Application No. PCT/EP2011/006512, filed on Dec. 22, 2011 and claiming priority to European Application No. 10016050.6, filed on Dec. 23, 2010, and European Application No. 11005594.4, filed on Jul. 8, 2011. The entirety of U.S. patent application Ser. No. 13/990,281 is incorporated by reference herein.

BACKGROUND OF THE INVENTION

Field of the Invention

Embodiments of the invention relate to integration of data and telephony networks.

Background of the Related Art

The integration of telecommunication networks and data networks is becoming increasingly important. Telecommunication networks are used primarily for communication by telecommunication subscribers using telecommunication terminals such as telephones. Data networks are used primarily for networking computers, for example PCs with servers. Methods and arrangements whereby applications installed on computers control and monitor communication systems and communication connections are generally known as CTI solutions (CTI=Computer Telephony Integration). Both communication system ports and connections between ports can be controlled and monitored in this manner. The respective connections are temporary communication channels between two or more subscribers to one or more communication systems.

When a CTI solution is operating, data with control and status information are transmitted each time between a communication system and a CTI application (CTI application program). To this end, communication systems have special interfaces for the data exchange: CTI interfaces. The respective applications or PCs likewise have corresponding CTI interfaces for this data exchange.

For this, the CTI interfaces of the communication system and those of the application are connected with one another via a data line or a data network. Because the maximum number of CTI interfaces in a communication system is limited, a telephony server is often connected between the communication system and the applications.

The publication WO 98/51092 A1 "Computer Telephony Integration Gateway" shows a public communication network with several communication systems and a private communication network with several domains, each of which features computers with applications for controlling and/or monitoring the public communication network's resources. The arrangement shown features a "CTI gateway" as a conversion device, which changes the type of data sent for controlling and/or monitoring resources from the public communication network to the private communication network, so that these data appear as the data from one single public communication network, and conversely changes the data that are sent by the applications from the private communication network to the public communication network, as though they had been sent from a private communication network with only one application.

DE 101 59 636 B4 describes a method for controlling and/or monitoring resources and connections using the exchange of data between communication systems and at least one application, wherein the data have identifiers that differentiate the resources and the connections, and the identifiers of the resources are converted during the exchange such that they present themselves as the identifier of one single communication system with subscriber connections for the one or for each application, characterized in that each of the identifiers of the connection between resources of different communication systems comprises one local connection number (call ID) of the communication system that participates in the connection and one global connection number (call ID) and in that through the conversion the global connection number (call ID) is transmitted to the application such that it cannot be differentiated by the application from a local connection number (call ID).

BRIEF SUMMARY OF THE INVENTION

Embodiments relate to methods for automatic startup of a first communication terminal configured for speech communication on at least one second communication terminal configured for text communication, in which the speech communication between communication terminals is processed through at least one speech communication server and the text communication between communication terminals is processed through at least one text communication server. Embodiments also relate to arrangements for automatic transmission of information on the startup of at least one first communication terminal configured for text communication, to at least one second communication terminal configured for speech communication, with at least one text communication server for processing the text communication between communication terminals and at least one speech communication server for processing the speech communication between communication terminals.

The XMPP protocol is a well-known type of instant messaging protocol that plays an important role in computer-telephony integration. Known XMPP protocol-based client/server architectures are operated asynchronously to the telephone. Automatic connection and startup are not part of known solutions. Embodiments of the invention may provide for automatic startup of a CTI server operating in an XMPP environment, for example.

DETAILED DESCRIPTION OF THE INVENTION

Figure 1:
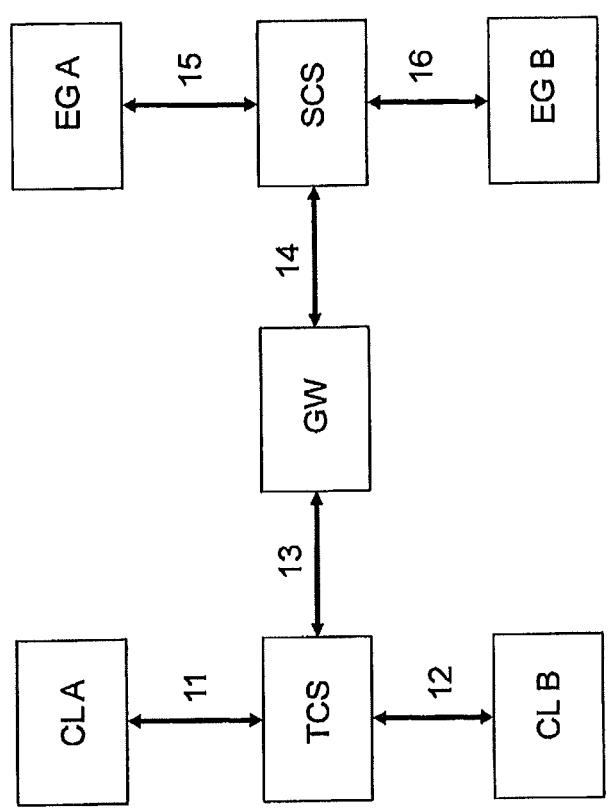
FIG. 1 schematically, a first arrangement of system components for carrying out an exemplary embodiment of a method according to invention.

The invention involves a method for automatic startup of at least one first communication terminal configured for speech communication on at least one second communication terminal configured for text communication, in which the speech communication between communication terminals is processed through at least one speech communication server and the text communication between communication terminals is processed through at least one text communication server. The at least one speech communication server and the at least one text communication server exchange messages through at least one converter device, and the startup is signaled from at least one first communication terminal through the at least one text communication server, the at least one converter device, and the at least one speech communication server to at least one second communication terminal.

According to one preferred embodiment of the invention, whose features can also be combined with the features of other embodiments of this invention, startup signaling information is then transmitted between the text communication server and the speech communication server if the speech communication server has previously signaled to the text communication server that the startup should occur.

According to another preferred embodiment of the invention, whose features can also be combined with the features of other embodiments of this invention, startup signaling information is then transmitted between the text communication server and the speech communication server to an extent specified in a prior signal.

According to another preferred embodiment of the invention, whose features can also be combined with the features of other embodiments of this invention, the method includes the transmission of at least one piece of startup signaling information to a communication terminal.

According to another preferred embodiment of the invention, whose features can also be combined with the features of other embodiments of this invention, at least the speech communication server transmits messages without prompting.

Embodiments may include an arrangement for automatic transmission of information on the startup of at least one first communication terminal configured for text communication, to at least one second communication terminal configured for speech communication, with at least one text communication server for processing the text communication between communication terminals and at least one speech communication server for processing the speech communication between communication terminals. In this regard, at least one converter device is provided through which the at least one speech communication server and the at least one text communication server exchange messages. The startup information for at least the first communication terminal is transmitted through the at least one text communication server, the at least one converter device, and the at least one speech communication server to at least one second communication terminal.

According to one preferred embodiment of the invention, whose features can also be combined with the features of other embodiments of this invention, the arrangement is configured such that startup signaling information is transmitted between the speech communication server and the text communication server if the speech communication server has previously signaled to the text communication server that the transmission should occur.

According to another preferred embodiment of the invention, whose features can also be combined with the features of other embodiments of this invention, startup signaling information is transmitted between the speech communication server and the text communication server to an extent specified in a prior signal.

According to another preferred embodiment of the invention, whose features can also be combined with the features of other embodiments of this invention, at least one piece of startup signaling information that is transmitted to a communication terminal includes at least one piece of operating information.

According to another preferred embodiment of the invention, whose features can also be combined with the features of other embodiments of this invention, at least the speech communication server transmits messages without prompting.

Depending upon the embodiment, an advantage of the solution according to the invention is that a method for automatic startup of a communication terminal configured for speech communication on a communication terminal configured for text communication can start up version-dependent CTI control, known as "machine-to-machine" communication, by itself (automatically) without parameters needing to be configured for this. Both "machines," i.e., the switch (the PBX) and the XMPP server, communicate their CTI capabilities to each other and adapt by themselves (automatically) to the abilities of their partners without outside intervention (negotiation of capabilities). This means that a user (in general and for start/restart) does not have to go through any registration procedures (such as configuration during setup/installation of a program like Microsoft Word). The invention therefore provides the basis for synchronization between (switch/PBX=Speech server and XMPP server=Presence server) and marries Speech with Presence (similar to the relationship between motor and chassis).

The invention is described below in more detail based on preferred exemplary embodiments and with reference to the figures.

FIG. 1 presents one preferred exemplary embodiment of an arrangement according to the invention. In this example a speech communication server SCS is connected with two terminals EGA and EGB configured for speech communication, and exchanges speech messages and status information 15, 16 with these two communication terminals. For example, if the status of the communication terminal EGA changes, then said communication terminal EGA transmits a corresponding status information item to the speech communication server SCS, whereupon the latter transmits the status information or corresponding status change information 14 to the converter device GW. Thereupon, the converter device GW transmits corresponding status information or status change information 13 to the text communication server TCS with which the two text communication clients CLA and CLB are communicating 11, 12.

In this example, the text communication client CLA is used by the communication subscriber who is also using the speech communication terminal EGA. Accordingly, the text communication client CLB is used by the communication subscriber who is also using the speech communication terminal EGB.

In this manner it is possible for the communication subscriber who is using the text communications client CLB to be informed of a change in status of the speech communication terminal EGA, without user A having to initiate a manual transmission of information to user B.

Figure 2:
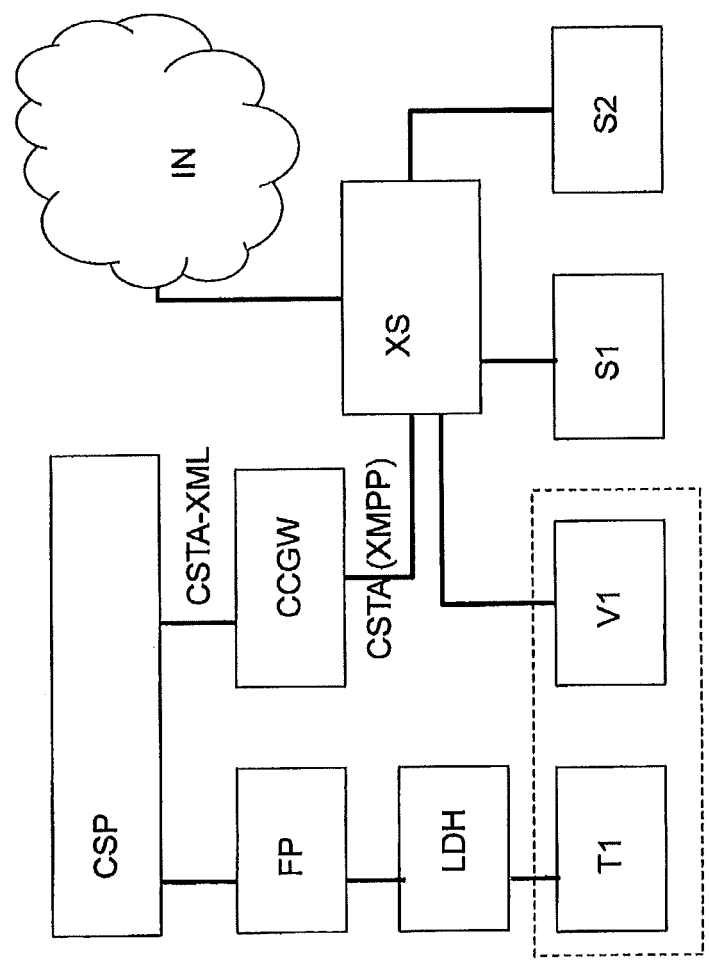
FIG. 2 schematically, a second arrangement of system components for carrying out an exemplary embodiment of a method according to invention.

Embedding the call control gateway CCGW into the overall system, shown in FIG. 2, which can be done with OpenScape Office MX, for example, is shown only as an example and is intended to represent the general idea of the invention, in which the method for automatic startup of at least one first telecommunication terminal (EG A, EG B) configured for speech communication on at least one second telecommunication terminal (CL A, CL B) configured for text communication, in which the speech communication between communication terminals is processed through at least one speech communication server (SCS) and the text communication between communication terminals is processed through at least one text communication server (TCS), is such that the at least one speech communication server (SCS) and the at least one text communication server (TCS) exchange messages through at least one converter device (GW), and is such that the startup of at least the first communication terminal (CL A, CL B) is signaled through the at least one text communication server (TCS), the at least one converter device (GW), and the at least one speech communication server (SCS) to the at least second communication terminal (EG A, EG B).

In this embodiment, the speech communication server SCS consists of a CSTA service provider (CSP), a feature processor (FP), and a LAN device handler (LDH), among other things. The references EG A and EG B designate terminals as shown, GW designates a call control gateway (CCGW), the text communication server (TCS) in this example is an Openfire XMPP server, and the clients CL A and CL B are represented by Spark XMPP clients (S1, S2), for example. Here it is possible, but not necessary, for the components described above to be physically connected to each other or located within a certain domain.

The communication channel (13) between the CCGW (GW) and the XMPP (TCS) server can consist of an XMPP server/server connection, with the CCGW acting as a standalone XMPP server. It can also consist of an XMPP client/server connection in which the CCGW is handled as a client in the XMPP server (e.g., Openfire). A third possibility is for the CCGW to be a server component of the XMPP server, as in XEP 0114, for example. The communication channel (13) between the CCGW (GW) and the XMPP (TCS) server is also used, for example, to transmit startup information from at least one first communication terminal (CL A, CL B) through the at least one text communication server (TCS), the at least one converter device (GW), and the at least one speech communication server (SCS) to the at least one second communication terminal (EG A, EG B).

The PBX, a switching system, and the instant messaging server XS, for example an XMPP server, are connected using a call control gateway (CCGW). The CCGW is the connection between the CTI of a PBX and the XMPP server. An XMPP client can subscribe to and provide CTI services via this call control gateway. In one embodiment of the invention, this preferably consists of the CSTA call control services and events described in ECMA-269 (Standard ECMA-269, Services for Computer-Supported Telecommunications Applications (CSTA) Phase III, 8th edition (June 2009)). This document (http://www.ecma-international.org/publications/standards/Ecma-269.htm) is part of this description.

On the one side, the connection to the feature processor is established via CSTA XML by means of a so-called CSTA service provider (CSP). On the other side, the CSTA is transmitted via XMPP to the XMPP server (Openfire in the embodiment according to the figure). Using the CCGW, an XMPP client (Spark in the embodiment according to the figure) can subscribe to CTI services.

To guarantee automatic startup of the CTI functionality, the following steps should be followed:

Step 1:

Upon signing on to the server, the client asks for the server's characteristics through the Discovery service (in an embodiment according to XEP-0030). The response includes one or more <feature/> elements, among other things. Each of these elements includes a "var" attribute that represents the supported namespace. The possible CTI functionality is added in this available namespace.

If the response in the received <feature/> elements contains a reference to general or version-specific CTI support, a positive query result (the client supports this CTI version) allows CTI services to be requested from the server by means of a query stanza from the determined namespace, contained in a "Get" type of IQ stanza.

If the response from the server includes multiple CTI versions that the client also supports, the client is given a choice from a priority list with prioritized CTI versions or namespaces or can choose the first namespace named in the response.

When there is general CTI support from the server, the CTI version query occurs only after a request for CTI functionality.

Step 2:

When a client uses the Discovery service (in one embodiment according to XEP-0030), the server sends the CTI versions that it supports through the namespace established for the <feature/> elements.

Depending upon the embodiment of the invention, it preferably supports the C STA XML Edition 3 (<feature var="http://www.ecma-international.org/standards/ecma-323/csta/ed3"/>) or the CST XML Edition 5 (<feature var="http://www.ecma-international.org/standards/ecma-323/csta/ed5"/>).

Concrete support of a CTI version allows the server to run its own validation tests. One type of validation test is positive assignment of the requested CTI service to the JabberID and the call number assigned to the client. This allows the server to make decisions regarding the quality of the CTI connection (1st party or 3rd party).

With a 1st-party CTI connection, the client can only execute CTI services for the call number assigned the Jabber ID; other service requests will be denied. With a 3rd-party CTI connection, the client can execute CTI services for any call numbers.

If the server does not support a concrete CTI version, the server can leave CTI version testing to the CCGW or the CTI instance next in line.

For the CTI request by the client through IQ, the server sends back the status of the CCGW and the call numbers assigned to the client (device list).

To make networking scenarios possible, as an option this response can also refer to another server that also supports CTI functionality. In this case, the response does not provide a device list, and the CCGW status is stated as "unknown." The client's next step is to start over with the Discovery service using the now-known server.

Another networking possibility is having a single server support multiple CCGWs.

If the server receives a login/logoff message from the CCGW, the server sends a status message to all clients that have subscribed to CTI functionality. This status message is also generated by the server when the connection to the CCGW is terminated.

Step 3:

Logging in to the server makes the CTI connection available. The CCGW checks the CTI version and terminates the connection if the CCGW does not support that CTI version. If applicable, the CCGW leaves CTI version testing to the CTI instance next in line.

As an option, the direct presence status can be used to support automatic startup.

a) CCGW Availability

After the CCGW starts, it sends a direct presence message to the XMPP server that provides the CTI functionality. This causes the XMPP server to start a mechanism that informs any already registered CTI-capable clients assigned to this CCGW that the CCGW is now available (this is useful when the XMPP server has multiple CCGWs available).

If the connection between the CCGW and the CTI-controlled XMPP server is now unexpectedly terminated, the XMPP server receives the presence message telling it that the CCGW is no longer available. This allows the XMPP server to inform all logged-in clients assigned to this CCGW that their CCGW is currently no longer available and therefore CTI functionality has been discontinued.

b) Availability of a CSTA-Capable Client

If a client receives a status message from an XMPP server saying that the assigned CCGW is now reachable (regardless of whether the status message is the response from the XMPP server to the CTI service query or whether the status message is the result of a subsequently available CCGW), then the client sends a direct presence message to the CCGW. This causes the XMPP server to inform the CCGW if the client is no longer available, even if the CCGW is not in the client's contact list.

If the CCGW reports that one of its clients is no longer available, then the system tests to see whether that client has a monitor point set. If so, a "MonitorStop" can be sent automatically in place of that client to the CTI instance next in line.

Figure 3:
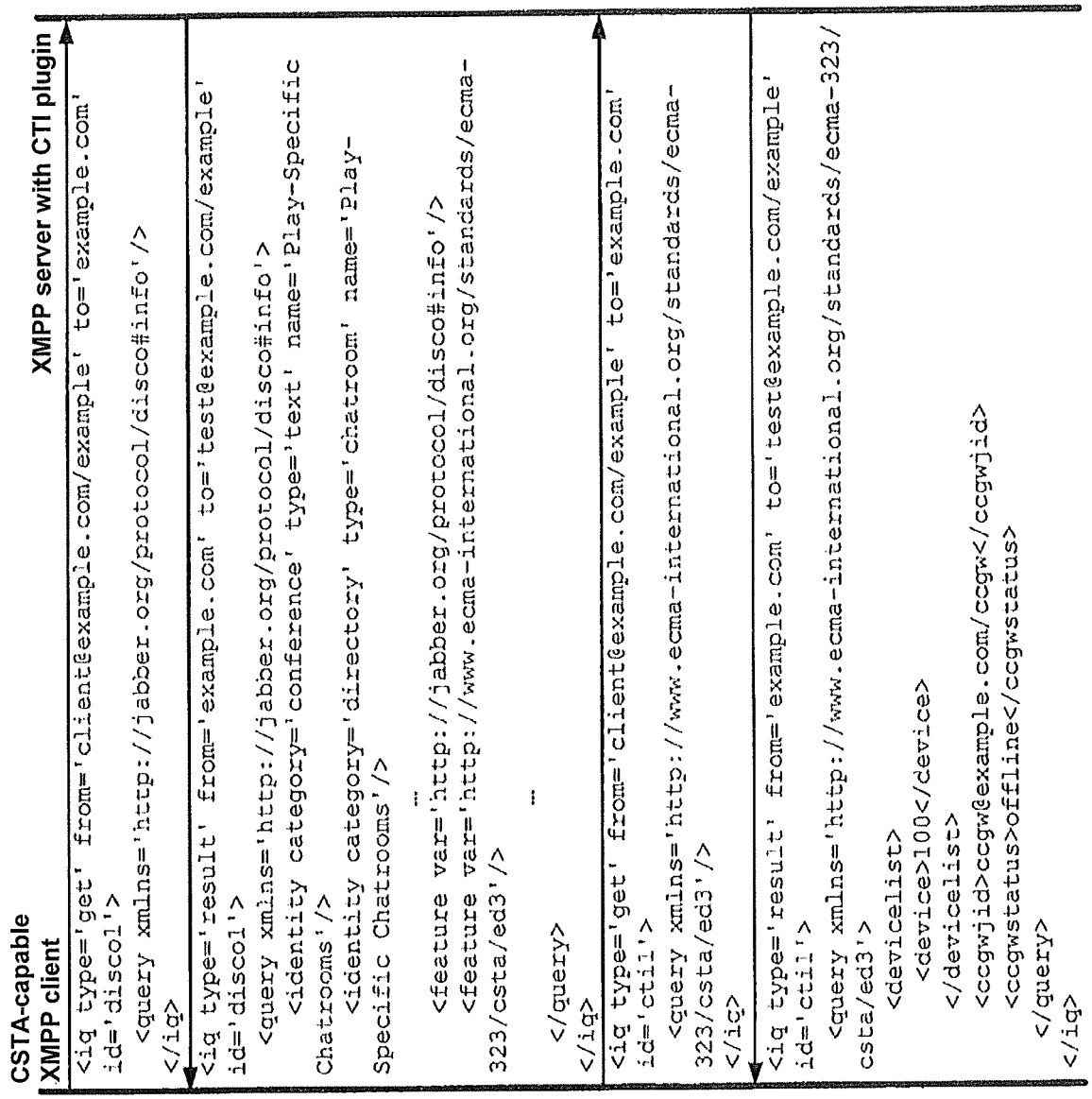
FIG. 3 schematically, a sequence of steps in a method according to a first exemplary embodiment of the invention.
Figure 4:
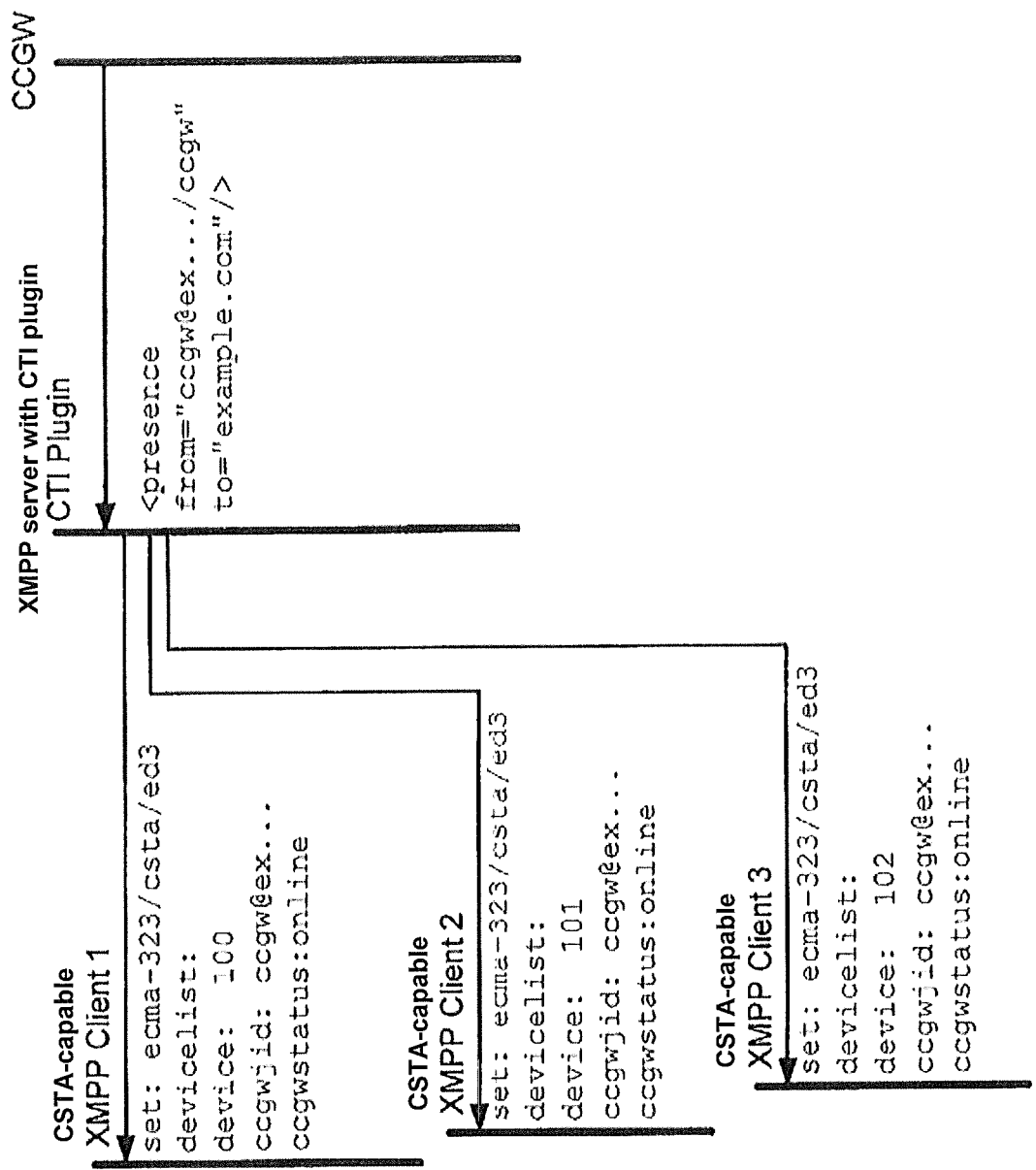
FIG. 4 schematically, a sequence of steps in a method according to a second exemplary embodiment of the invention.
Figure 5:
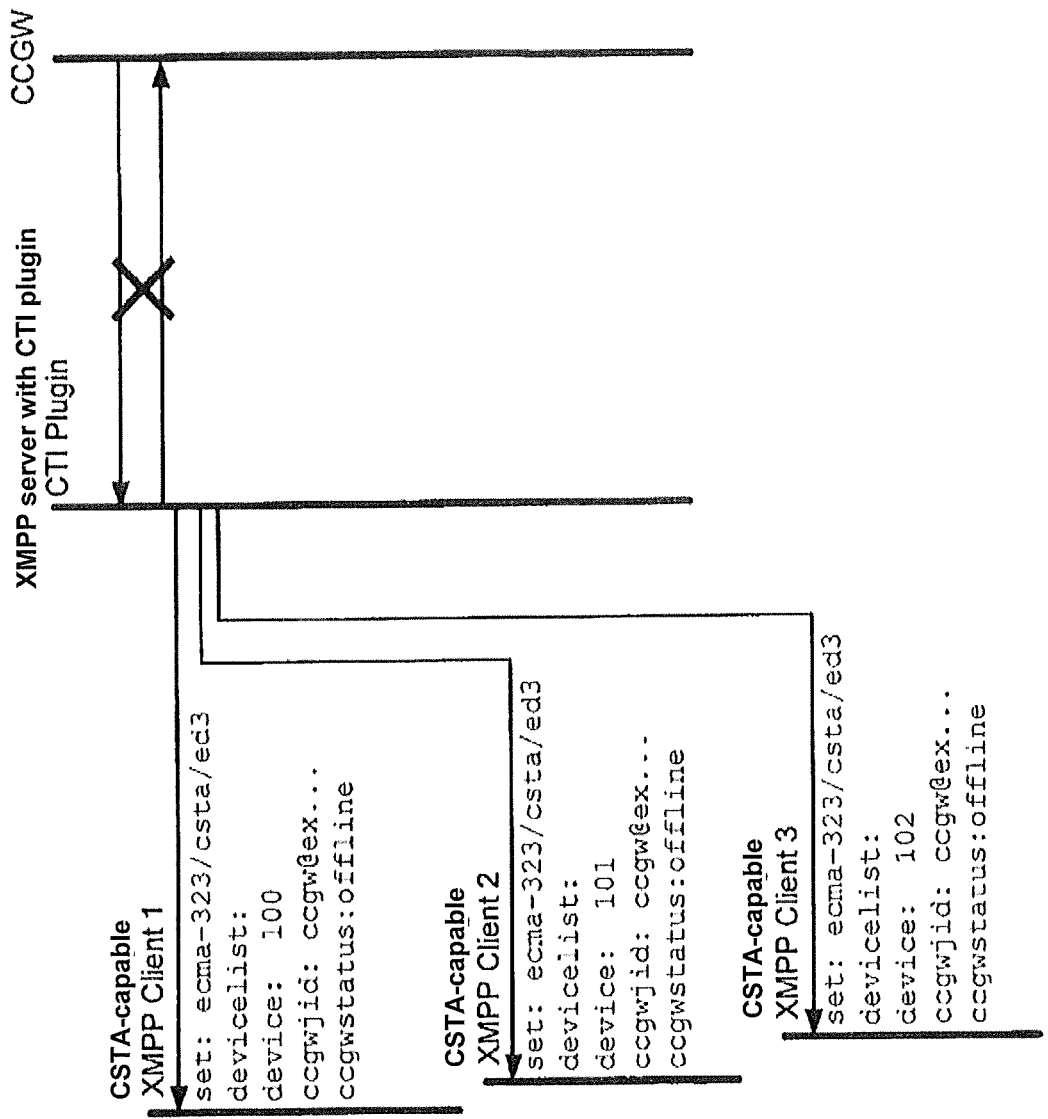
FIG. 5 schematically, a sequence of steps in a method according to a third exemplary embodiment of the invention.

FIGS. 3, 4, and 5 show examples of the Discovery service and the subsequent CTI service requests.

In FIG. 3, the CSTA-enabled XMPP client represented by the left vertical line sends a message within the Discovery service to the XMPP server with CTI plugin represented by the right vertical line. The CTI-enabled XMPP server responds to this query. This allows the client to recognize the CTI capability of the XMPP server, and the client then requests a CTI service, to which the XMPP server responds with the assigned device, address, and status of the CCGW.

The CCGW login and logout while clients are already logged in are described below based on various embodiments of the invention.

The embodiment shown in FIG. 4 is based on the assumption that the three clients have already logged in to the XMPP server as previously described.

For reasons of clarity, the messages between the XMPP server and the three CSTA-capable clients shown here are shortened, and the client acknowledgement ("result" type of IQ stanza and in it a query stanza for the namespace http://www.ecma-international.org/standards/ecma-323/csta/ed3) is not shown.

FIG. 4 shows the CCGW login using a direct presence message with an XMPP server. FIG. 5 shows a message flow in the case of an unexpected breakdown in the connection between the CCGW and the XMPP server.

Figure 6:
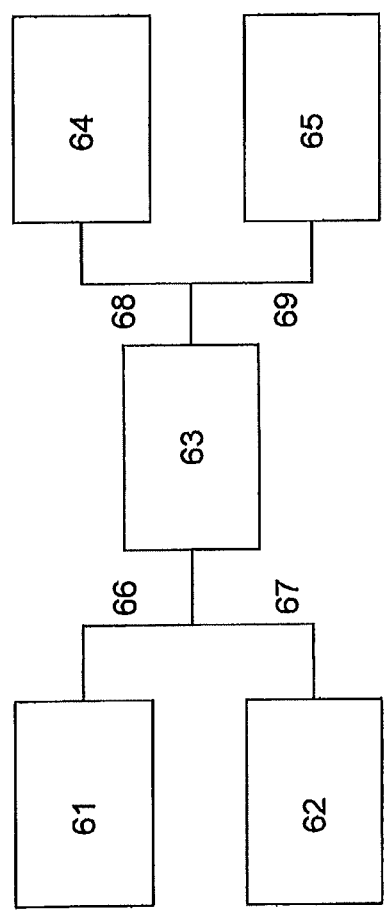
FIG. 6 schematically, a third arrangement of system components for carrying out an exemplary embodiment of a method according to invention.
Figure 7:
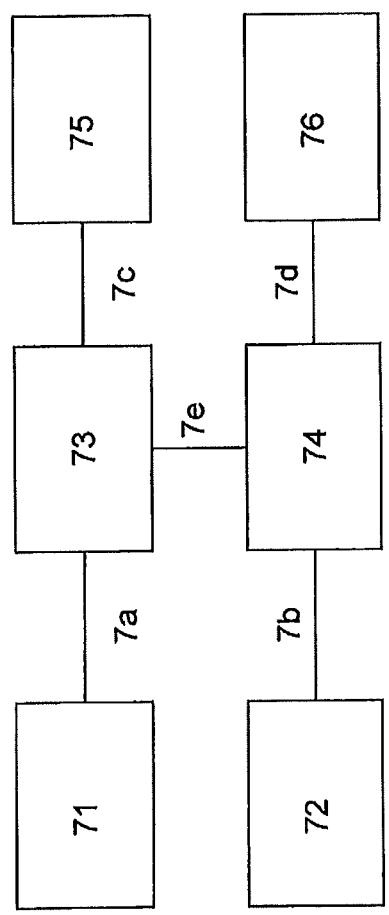
FIG. 7 schematically, a fourth arrangement of system components for carrying out an exemplary embodiment of a method according to invention.
Figure 8:
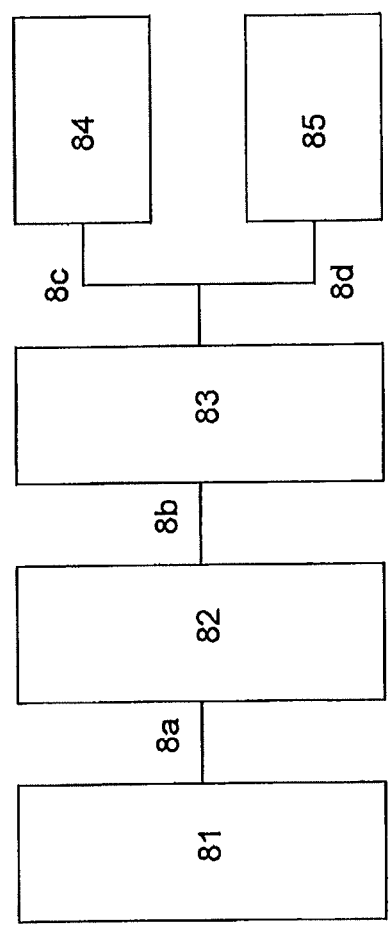
FIG. 8 schematically, a fifth arrangement of system components for carrying out an exemplary embodiment of a method according to invention.

FIGS. 6, 7, and 8 show possible networking scenarios involving several embodiments of the invention. In the embodiment shown in FIG. 6, a server 63, preferably an XMPP server with a configuration plugin for CSTA through XMPP, has assigned two different CCGWs 64, 65, with which it communicates preferably through message paths 68, 69. The server 63 communicates preferably through the message paths 66, 67 with clients 61, 62, which are preferably XMPP clients with a CTI plugin. The configuration plugin preferably is set to indicate to which CCGW a client's messages will be forwarded.

In the embodiment shown in FIG. 7, each of the two servers 73, 74 has a CCGW 75, 76 in its domain. The servers 73 and 74 are preferably XMPP servers. The message paths 7a, 7b, 7c, 7d, and 7e represent the message paths via which the units 71, 72, 73, 74, 75, and 76 communicate with each other. It is preferably possible for the CCGW of another domain to be used as well. This makes it possible, for example, for the client 72 or the client 71 to use the CCGW 75 or 76, although they are in different domains. The clients 71 and 72 are preferably XMPP clients.

In the embodiment shown in FIG. 8, the server 82 of the client 81 does not have the full configuration plugin, but rather a reduced configuration plugin, which refers the client 81 to another server 83 that does have the full plugin. The message paths 8a, 8b, 8c, and 8d represent the message paths via which the units 81, 82, 83, 84, and 85 communicate with each other. The servers 82 and 83 are preferably XMPP servers. The client 81 is preferably an XMPP client.

Embedding into the overall system, as in the example of OpenScape Office MX, is intended to represent a general approach, in which the method for automatic startup of at least one first telecommunication terminal (EG A, EG B) configured for speech communication on at least one second telecommunication terminal (CL A, CL B) configured for text communication, in which the speech communication between communication terminals is processed through at least one speech communication server (SCS) and the text communication between communication terminals is processed through at least one text communication server (TCS), is characterized in that the at least one speech communication server (SCS) and the at least one text communication server (TCS) exchange messages through at least one converter device (GW), and in that the startup of the at least first communication terminal (CL A, CL B) is transmitted through the at least one text communication server (TCS), the at least one converter device (GW), and the at least one speech communication server (SCS) to the at least second communication terminal (EG A, EG B).

The Components of the OpenScape Office MX are Preferably:

SCS: including CSTA Service Provider (CSP), Feature Processor (FP), and LAN Device Handler (LDH), among other things
    EG A, EG B: communication terminals
    GW: Call Control Gateway (CCGW)
    TCS: XMPP Server—Openfire
    CL A, CL B: XMPP Clients—Spark Here it is not necessary for the components described above to be physically connected to each other or located within a certain domain.

The Communication Channel Between the CCGW and the XMPP Server Preferably Consists of:

either an XMPP server ⇔ server connection, i.e. the CCGW acts as an autonomous XMPP server;

or an XMPP client ⇔ server connection, i.e., the CCGW is handled as a client in the XMPP server (e.g., Openfire);

or a server component, e.g., according to XEP 0114, i.e., the CCGW is a server component of the XMPP server.

The invention claimed is:

1. A method for automatic transmission of information on status and status change upon a status change of at least one first communication terminal configured for speech communication in which speech communication between communications terminals is processed over at least one speech communications server and the text communication between communications terminals is processed over at least one text communications server, the method comprising:
at least one speech communication server and the at least one text communication server exchanging messages over at least one converter device;
signaling a status change startup of the at least one first communication terminal via the at least one text communication server, the at least one converter device, and the at least one speech communication server to a second communication terminal such that startup signaling information is transmitted between the text communication server and the speech communication server after the speech communication server had previously signaled to the text communication server that the startup should occur via a signaling process comprising:
upon the first communication terminal signing on to the speech communication server, the first communication terminal requesting characteristics of the speech communication server via a discovery service so that the speech communication server identifies a Computer Telephony Integration (CTI) service related to exchanging of data between the first communication terminal and the second communication terminal that the text communication server supports;
the first communication terminal requesting a first CTI service from the speech communication server in response to learning of the CTI service supported by the speech communication server;
the speech communication server responding to the request for the first CTI service by providing a status of the converter device and an identifier assigned to the first communication terminal; and
the converter device receiving a direct presence message from the first communication terminal after the first communication terminal receives the status of the converter device to force the speech communication server to inform the converter device when the first communication terminal is no longer available.

2. The method of claim 1, wherein the startup signaling information is transmitted between the text communication server and the speech communication server as specified in a prior signal.

3. The method of claim 1, comprising:
transmitting of at least one piece of startup signaling information to the second communication terminal.

4. The method of claim 1, comprising:
at least the speech communication server transmitting messages without prompting.

5. The method of claim 1, wherein the at least one first communication terminal includes a client of a CTI server and the transmission of information is for startup of a CTI functionality.

6. A communication apparatus comprising:
at least one first communication terminal configured for text communication;
at least one second communication terminal configured for speech communication,
at least one text communication server to process text communication;
at least one speech communication server to process speech communication;
at least one converter device through which messages are exchangeable between the at least one speech communication server and the at least one text communication server,
wherein the communication apparatus is configured such that startup information on status change for startup of the at least the first communication terminal is transmitted through the at least one text communication server, the at least one converter device, and the at least one speech communications server to the at least one second communication terminal such that startup signaling information is transmitted between the speech communication server and the text communication server after the speech communication server had previously signaled to the text communication server that transmission of the signaling information should occur via a signaling process that includes:
upon the first communication terminal signing on to the text communication server, the first communication terminal requesting characteristics of the text communication server via a discovery service so that the text communication server identifies a Computer Telephony Integration (CTI) service related to exchanging of data between the first communication terminal and the second communication terminal that the text communication server supports;
the first communication terminal requesting a first CTI service from the text communication server in response to learning of the CTI service supported by the text communication server;
the text communication server responding to the request for the first CTI service by providing a status of the converter device and an identifier assigned to the first communication terminal; and
the converter device receiving a direct presence message from the first communication terminal after the first communication terminal receives the status of the converter device to force the text communication server to inform the converter device when the first communication terminal is no longer available.

7. The communication apparatus of claim 6, wherein the startup signaling information is transmitted between the speech communication server and the text communication server to an extent specified by a previous signaling.

8. The communication apparatus of claim 6, wherein at least one piece of startup signaling information transmitted to the at least one second communication terminal, the at least one piece of startup signaling information comprising at least one piece of operating information.

9. The communication apparatus of claim 6, wherein at least the speech communication server is configured to transmit messages without prompting.

10. The communication apparatus of claim 6, wherein the at least one first communication terminal includes a client of a CTI server and the transmission of information is for startup of a CTI functionality.

11. A communication apparatus comprising:
a call control gateway configured to be connected between at least one speech communication server and at least one text communication server to facilitate an exchange of messages between the speech communication server and the text communication server, the speech communication server configured to be communicatively connected to first communication terminals to facilitate speech communications between the first communication terminals via the speech communication server and the text communication server configured to be communicatively connected to second communication terminals to facilitate text communications between the second communication terminals via the text communication server;
the speech communication server and the text communication server, the speech communication server being configured as a switching system having a feature processor and a local area network device handler, the text communication server being an instant messaging server or a presence server;
the call control gateway configured to facilitate automatic startup of at least one Computer Telephony Integration (CTI) service for the first communication terminals by exchanging CTI capabilities messages between the speech communication server and the text communication server such that the speech communication server learns of the CTI capabilities of the text communication server and the text communication server learns of the CTI capabilities of the speech communication server via the exchanged CTI capabilities messages so that the speech communication server and the text communication server are synchronizable to marry speech service with presence service for users of the first and second communication terminals;
wherein the call control gateway is also configured to facilitate automatic startup of at least one CTI service for the second communication terminals by exchanging CTI capabilities messages between the speech communication server and the text communication server such that the speech communication server learns of the CTI capabilities of the text communication server and the text communication server learns of the CTI capabilities of the speech communication server via the exchanged CTI capabilities messages so that the speech communication server and the text communication server are synchronizable to marry speech service with presence service for users of the first and second communication terminals in response to a second communication terminal signaling the text communication server to ask about characteristics of the text communication server relating to possible CTI functionality of the text communication server;
the first and second communication terminals, the first communication terminals being configured to facilitate speech communications, the second communication terminals being configured to facilitate text communications;
each of the first communication terminals configured to sign on to the text communication server and request characteristics of the text communication server via a discovery service so that the text communication server identifies a CTI service related to exchanging of data between the first communication terminal and the second communication terminal that the text communication server supports;
each of the first communication terminals configured to request a first CTI service from the text communication server in response to learning of the CTI service supported by the text communication server;
the text communication server configured to respond to the request for the first CTI service by providing a status of the call control gateway and an identifier assigned to the first communication terminal; and
the call control gateway configured to receive a direct presence message from the first communication terminal after the first communication terminal receives the status of the call control gateway to force the text communication server to inform the call control gateway when the first communication terminal is no longer available.

12. The communication apparatus of claim 11, wherein the call control gateway is configured so that the CTI capabilities messages are exchangeable prior to an automatic startup of CTI services assigned to a first user of at least one of the first communication terminals and at least one of the second communication terminals.

13. The communication apparatus of claim 12, wherein status change information for at least one of the first communication terminals is included in the CTI capabilities messages prior to the startup of the CTI services assigned to the first user.

14. The communication apparatus of claim 13, wherein the call control gateway is configured such that the exchange of CTI capabilities messages occurs so that registration procedures for starting or restarting of a CTI service for the first user is avoided.

15. The communication apparatus of claim 14, wherein the call control gateway is configured to facilitate the exchange of CTI capabilities messages to occur after the speech communication server previously signaled to the text communication server that the exchange of CTI capabilities messages should occur.

16. The communication apparatus of claim 15, wherein the call control gateway is configured to facilitate the exchange of CTI capabilities messages such that a change in status of one of the first communication terminals assigned to the first user is communicatable to one of the second communication terminals assigned to a second user without manual input from the first user via one of the second communication terminals assigned to the first user occurring to effect a communication of that change in status.

17. The communication apparatus of claim 11, wherein the speech communication server is a private branch exchange or a switching system having a feature processor and a local area network device handler and the text communication server is one of an instant messaging server and a presence server.

18. The communication apparatus of claim 11, wherein each of the first communication terminals has a client for the first CTI service.

* * * * *